United States Patent
Liu et al.

(10) Patent No.: US 8,316,048 B2
(45) Date of Patent: Nov. 20, 2012

(54) METHOD AND APPARATUS FOR MANAGING A DATA STRUCTURE FOR MULTI-PROCESSOR ACCESS

(75) Inventors: Lisa Liu, Cuppertino, CA (US); Robert Johnson, Santa Cruz, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1677 days.

(21) Appl. No.: 10/920,915

(22) Filed: Aug. 17, 2004

(65) Prior Publication Data

US 2006/0053143 A1    Mar. 9, 2006

(51) Int. Cl.
*G06F 17/30* (2006.01)
(52) U.S. Cl. ...................... 707/781; 707/802
(58) Field of Classification Search .............. 707/104.1, 707/8, 781, 802; 711/118, 145, 163, 130
See application file for complete search history.

(56) References Cited

U.S. PATENT DOCUMENTS

| | | | | |
|---|---|---|---|---|
| 6,640,289 | B2* | 10/2003 | McCrory et al. | 711/144 |
| 6,986,003 | B1* | 1/2006 | Sipple et al. | 711/145 |
| 6,986,010 | B2* | 1/2006 | Sutanto et al. | 711/163 |
| 2003/0208661 | A1* | 11/2003 | Magoshi | 711/144 |
| 2005/0144397 | A1* | 6/2005 | Rudd et al. | 711/144 |
| 2005/0251791 | A1* | 11/2005 | Hundt | 717/130 |
| 2006/0136670 | A1* | 6/2006 | Brown et al. | 711/118 |
| 2006/0271745 | A1* | 11/2006 | Vaidya et al. | 711/145 |

* cited by examiner

*Primary Examiner* — Son T Hoang

(57) ABSTRACT

A method and apparatus for managing a data structure for multi-processor access are described. According to one embodiment, a request for a data structure is received. In response to the request, the requested data structure and a corresponding spin-lock are fetched from a computer readable medium. Once fetched, the requested data structure and corresponding spin-lock are stored in a single cache line. Following, in one example, exclusive access to the data structure is provided.

19 Claims, 9 Drawing Sheets

METHOD AND APPARATUS FOR MANAGING A DATA STRUCTURE FOR MULTI-PROCESSOR ACCESS

BACKGROUND

In a multi-processor system, it is common practice to use a spin-lock to protect shared data that can be modified by each of a plurality of processors included in the multi-processor system. A spin-lock ensures the integrity of shared data by allowing a single processor in such a multi-processor system to modify the shared data without interference from other processors in the system. In general, the shared data and the spin-lock are moved between the various processors that request access to the shared data. Accordingly, a spin-lock is used much like an access token.

Shared data is typically stored in a main computer memory. Accessing data stored in the main memory is often a slow process. This can reduce the effectiveness of a processor. To regain some of the effectiveness, a processor can be associated with a localized memory known as "cache" memory. A cache memory is a small, high-speed memory that functions to store data or instructions from recently used locations otherwise found in the main memory. In a multi-processor system, each processor has its own cache for storing data.

When a processor requests data from main memory, the cache is concurrently checked for the same data. If the data is found in the cache, then a cache-hit is produced and the main memory access request is abandoned. The requested data is retrieved from the cache in much less time than a full access to the main memory would require. If the data is not found in the cache, then a cache-miss results and the data is retrieved from main memory with the associated time penalty.

In a multi-processor system, each processor has to compete for shared data and an associated spin-lock. When a first processor acquires the spin-lock, it generally triggers a cache-miss, and the spin-lock is copied into the first processor's cache. The first processor can then retrieve shared data from memory, which triggers another cache miss. Once the first processor modifies the shared data and releases the spin-lock, a second processor can then acquire the spin-lock and retrieve the shared data. This process is inefficient because each access to the spin-lock typically results in a cache-miss. Even if a processor can successfully acquire the spin-lock, a second cache-miss results when the processor attempts to access the shared data.

SUMMARY

A method and apparatus for managing a data structure for multi-processor access are described. According to one embodiment, a request for a data structure is received. In response to the request, the requested data structure and a corresponding spin-lock are fetched from a computer readable medium. The requested data structure and corresponding spin-lock are stored in a single cache line. Exclusive access to the data structure is then provided.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
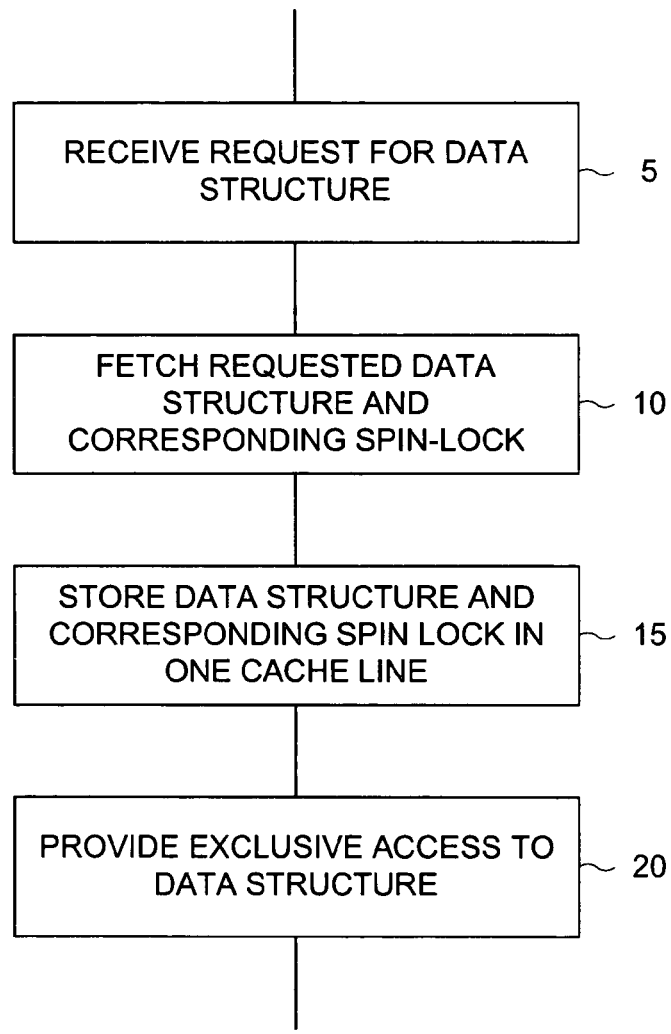
FIG. 1 is a flow diagram that depicts one example method for managing a data structure for multi-processor access.

FIG. 1 is a flow diagram that depicts one example method for managing a data structure for multi-processor access. According to this example method, a request for a data structure is received (step 5). In response to the request, the requested data structure and a corresponding spin-lock are fetched from a computer readable medium (step 10). Any suitable computer readable medium may be used, including but not limited to a hardware device, such as a memory component. In general, a memory component includes, but is not limited to various forms of volatile and/or non-volatile memory such as random access memory (RAM), read-only memory (ROM) and flash memory. Once the requested data structure and corresponding spin-lock are fetched, the requested data structure and corresponding spin-lock are stored in a single cache line (step 15). According to this example embodiment of the present method, exclusive access to the data structure is then provided (step 20).

According to one illustrative use case, the present method is applied in a system with two or more processors, wherein each processor has associated therewith a cache memory. In operation, a data management process receives a request for a data structure stored in a computer readable medium. In response to the request, the data management process fetches the requested data structure and a corresponding spin-lock from the computer readable medium. In application of the present method, the data management process is embodied as a process executed by a processor. When the processor executes the data management process, it is the processor that actually retrieves the requested data structure and the corresponding spin-lock from the computer readable medium.

The computer readable memory, according to another illustrative use case, comprises a main memory from whence data can be retrieved. When the requested data structure and the corresponding spin-lock are retrieved from the computer readable medium, hardware circuitry that manages the cache memory determines that the data structure and the corresponding spin-lock are not found in the cache. This hardware circuitry then completes a memory access cycle to the main memory in order to retrieve the requested data structure and corresponding spin-lock. As the hardware completes the access cycle to the main memory, the requested data structure and the corresponding spin-lock are also stored in a single cache line. In the event that the processor acquires the spin-lock, it can access the main memory in order to gain access to the data structure. In this case, the hardware circuitry that manages the cache memory will determine that the data structure is stored in the cache memory and will retrieve the data structure from the cache memory to direct the data structure to the requesting processor.

Figure 2:
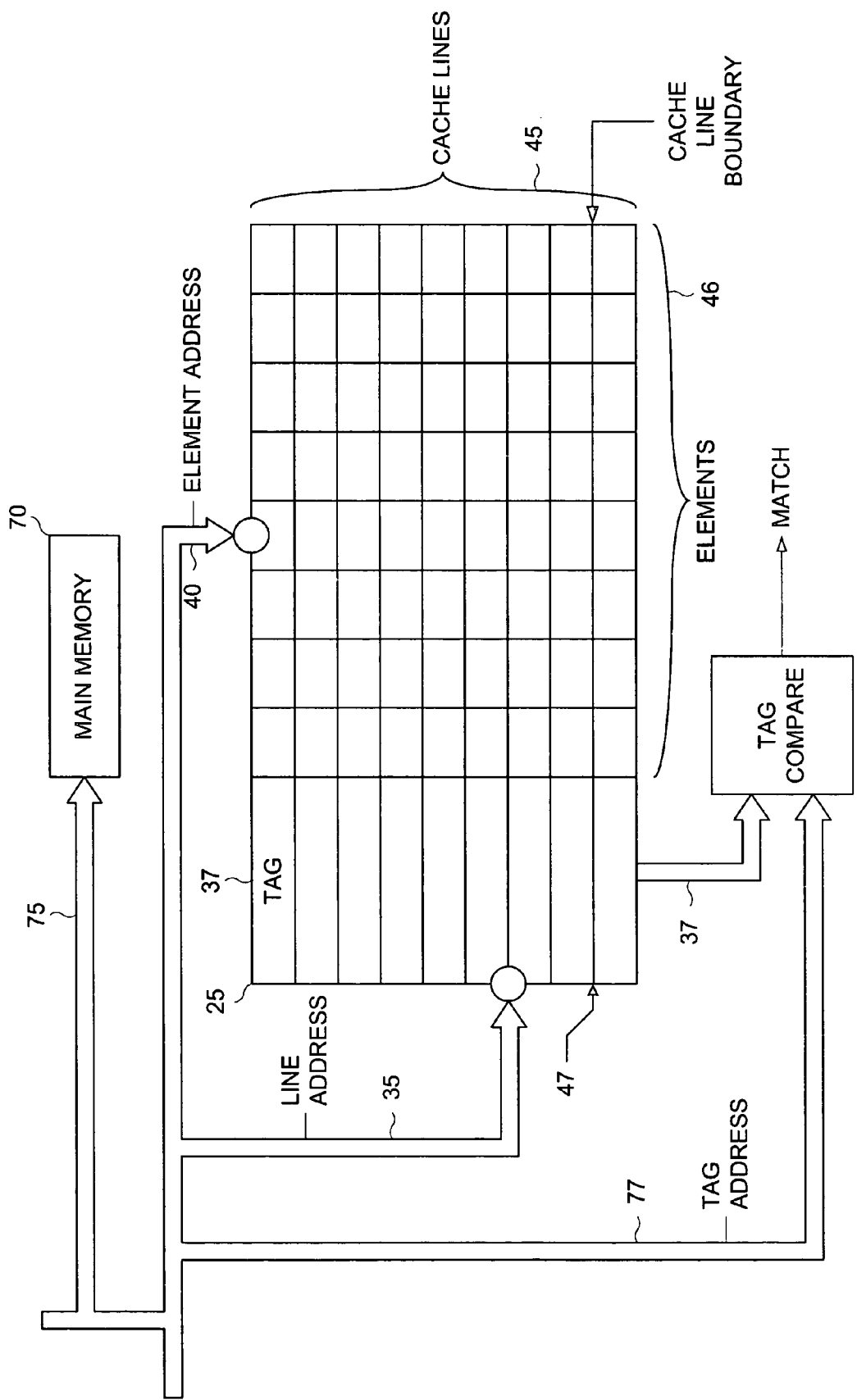
FIG. 2 is a pictorial representation of a cache memory.

FIG. 2 is a pictorial representation of a cache memory. It should be appreciated that the hardware that controls a cache memory generally operates on the notion of a cache line. A cache memory 25 is typically organized as a collection of cache lines 45. Each cache line includes some number of elements 46, each of which is addressable by means of an element address 40. Each individual cache line is likewise addressable by means of a line address 35. Generally, each line of the cache has associated with it an address tag 37. When a processor initiates an access to a main memory 70, the processor generates an access address 75 to select a specific location in the main memory 70. A portion of the processor's access address 75 is used as a line address 35 for the cache memory 25. When a particular cache line is selected, the address tag 37 stored in the selected cache line is compared against a different, and usually more significant portion of the processor's access address 75. This more significant portion of the access address 75 is called the tag address 77. In the event that a match results, the cache memory is assumed to have stored therein a cache line that corresponds to a location in the main memory 70 as dictated by the processor's access address 75. Generally, when a cache-miss occurs, the hardware that manages the cache memory 25 stores a copy of several locations of the main memory into one of the cache lines 45. This occurs even when the processor is only accessing a single location in the main memory 70. As such, if the processor were to access a location in the main memory that is in the same cache line space, i.e. according to a line address 35 portion of the processor's access address 75 and a tag address 77 portion of the access address, the cache would be "pre-loaded" with the data. This subsequent access to the main memory 70 would result in a "cache-hit". In the interest of clarity, a cache line boundary 47 exists between two contiguous lines in a cache memory. It should also be noted that the main memory is also organized along these same cache line boundaries, i.e. the main memory includes cache line boundaries that correspond to the cache line boundaries found in the cache memory.

Figure 2A:
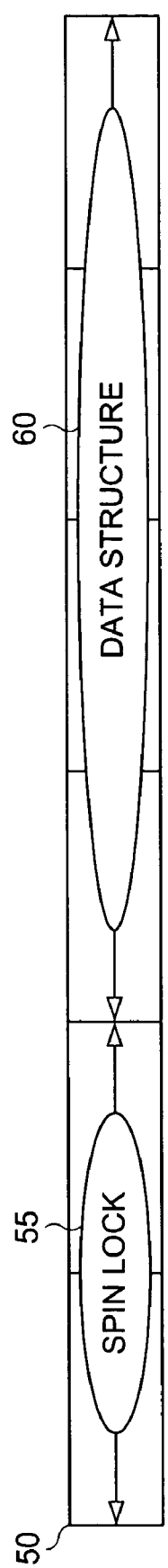
FIG. 2A is a pictorial representation that depicts the alignment of a spin-lock and a data structure to a cache line.

FIG. 2A is a pictorial representation that depicts the alignment of a spin-lock and a data structure to a cache line. According to one variation of the present method, a data structure 60 and its corresponding spin-lock 55 are stored in a single cache line 50 by managing the placement of the data structure 60 and the spin-lock 55 in a computer readable medium. By managing the placement of the data structure 60 and its corresponding spin-lock 55 in the computer readable medium, both the data structure 60 and the corresponding spin-lock 55 would be retrieved by a cache memory's hardware control circuit and stored in a single cache line 50. As such, both the data structure 60 and the corresponding spin lock 55 are placed in the computer readable memory such that they are aligned on a cache line boundary 47. What this means is that both the data structure 60 and the corresponding spin lock 55 are within the same portion of memory that is used to replace the contents of a cache line in a cache memory when a cache miss occurs.

Figure 3:
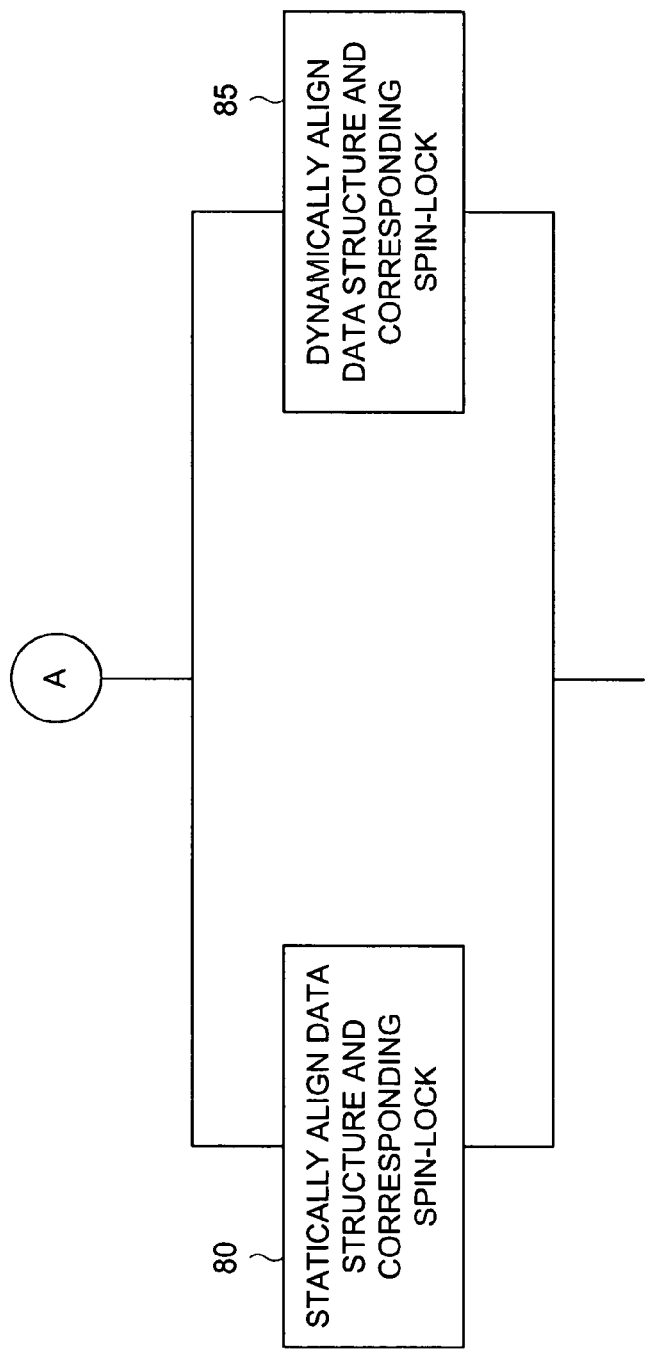
FIG. 3 is a flow diagram that depicts alternative methods for managing a data structure for multi-processor access.

FIG. 3 is a flow diagram that depicts alternative methods for managing a data structure for multi-processor access. According to one alternative method, a requested data structure and corresponding spin-lock is statically aligned to a cache line boundary (step 80). According to yet another alternative method, the requested data structure and corresponding spin-lock are dynamically aligned to a cache line boundary (step 85). Alignment by a static method is accomplished, according to one variation of the present method, by preparing a static memory image that has the data structure and the spin-lock aligned on a cache line boundary. Dynamic alignment to a cache line boundary is accomplished, according to yet another variation of the present method, by causing a memory allocation function provided in a computer system to allocate memory space for a data structure and its corresponding spin-lock such that the allocated memory is situated within a single cache line in the main memory.

Figure 4:
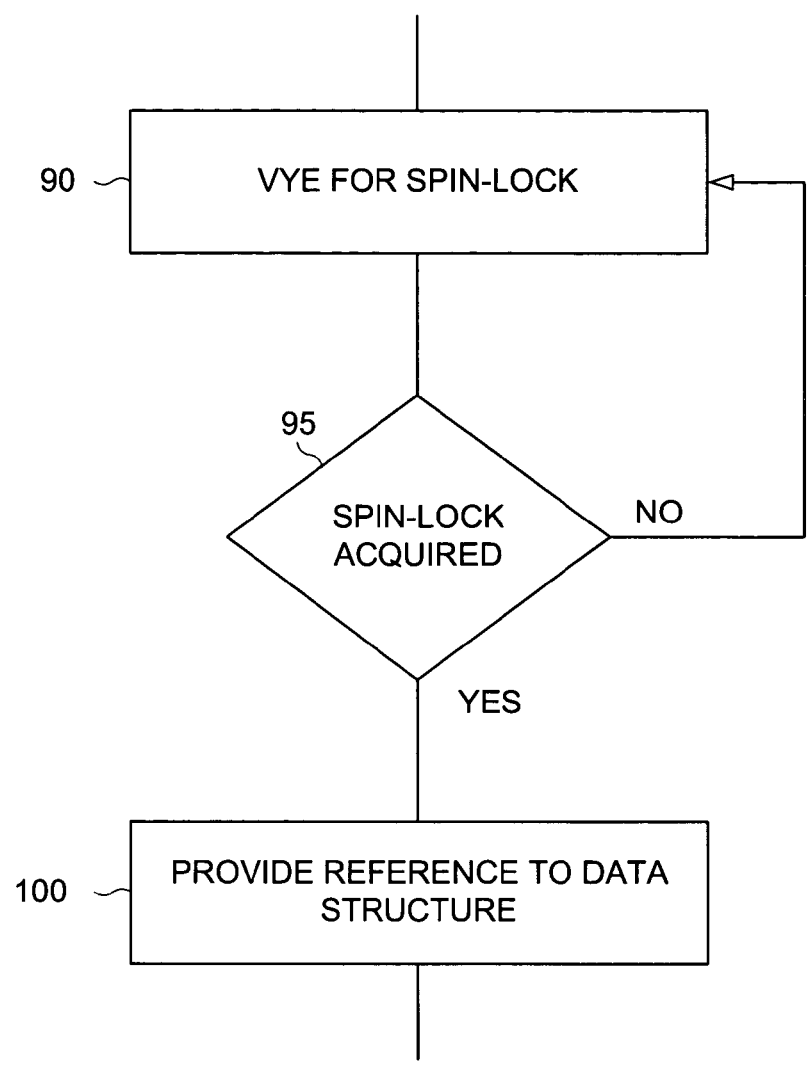
FIG. 4 is a flow diagram that depicts an alternative method for providing exclusive access to a data structure.

FIG. 4 is a flow diagram that depicts an alternative method for providing exclusive access to a data structure. According to this alternative method, the spin-lock is vied for (step 90). If the spin-lock is acquired (step 95), a reference to the data structure is provided (step 100). Otherwise, if the spin-lock is not acquired, the spin-lock is again vied for (step 90). It should be appreciated that a spin-lock may be repeatedly vied for in a cyclical manner, or the repeated cycle may be discontinued when a time-out period has been achieved.

Figure 5:
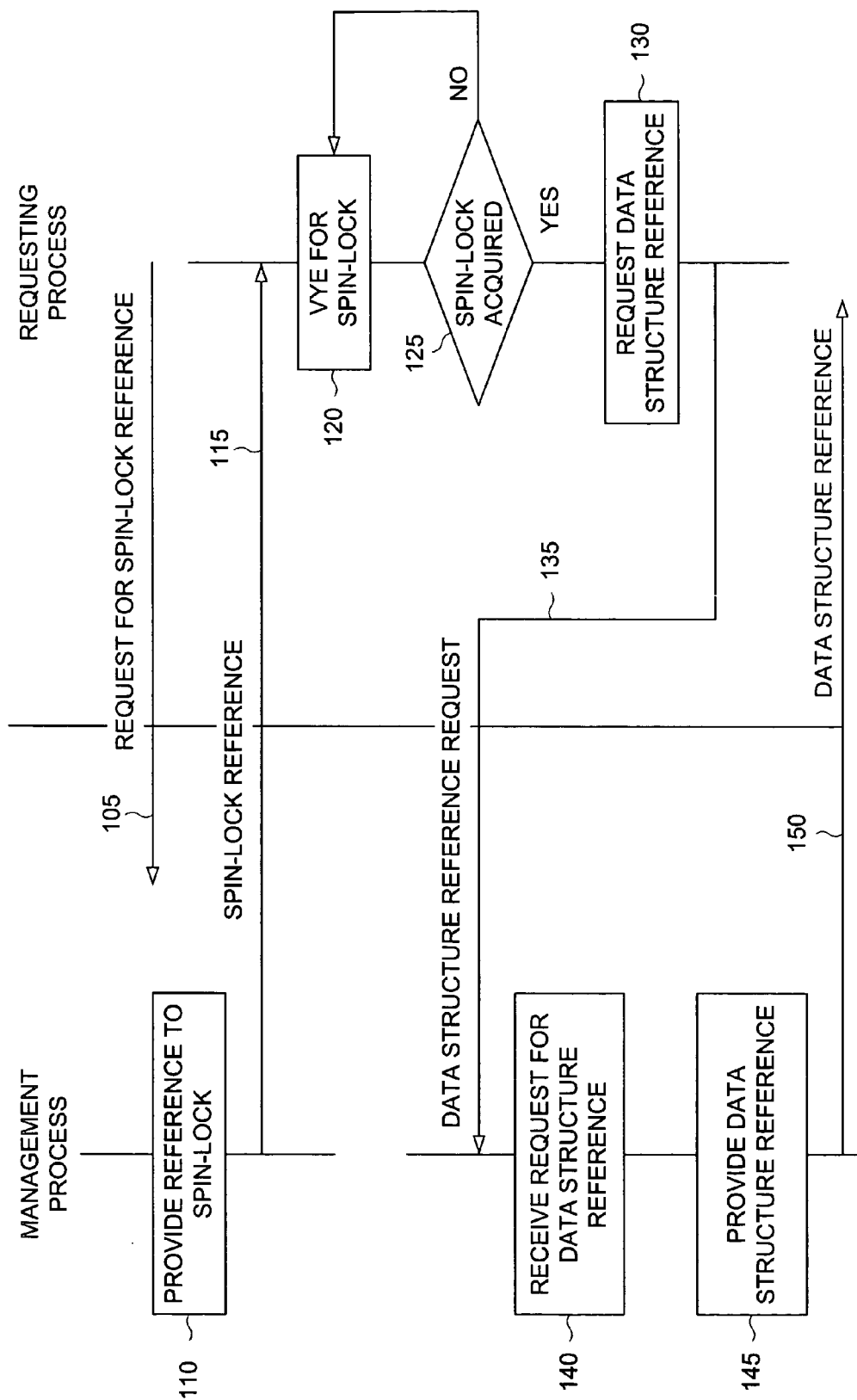
FIG. 5 is a message diagram that depicts another alternative method for providing exclusive access to the data structure.

FIG. 5 is a message diagram that depicts another alternative method for providing exclusive access to the data structure. According to this alternative method, a requesting process submits a request for a spin-lock reference (step 105). A management process receives the request and provides a reference to the requested spin-lock (step 110). The reference to the requested spin-lock is then transferred (step 115) to the requesting process, and the requested spin-lock may then be vied for (step 120) by the requesting process. If the requested spin-lock is acquired (step 125), a request for a data structure is made (step 130). The request for a data structure is then directed (step 135) to the management process. Otherwise, if the requested spin-lock is not acquired, the requested spin-lock is again vied for (step 120) by the requesting process. Following, the request for the data structure reference is received (step 140) by the management process, and the data structure reference is then provided in response to the request (step 145) as a data structure reference 150 to the requesting process.

Figure 6:
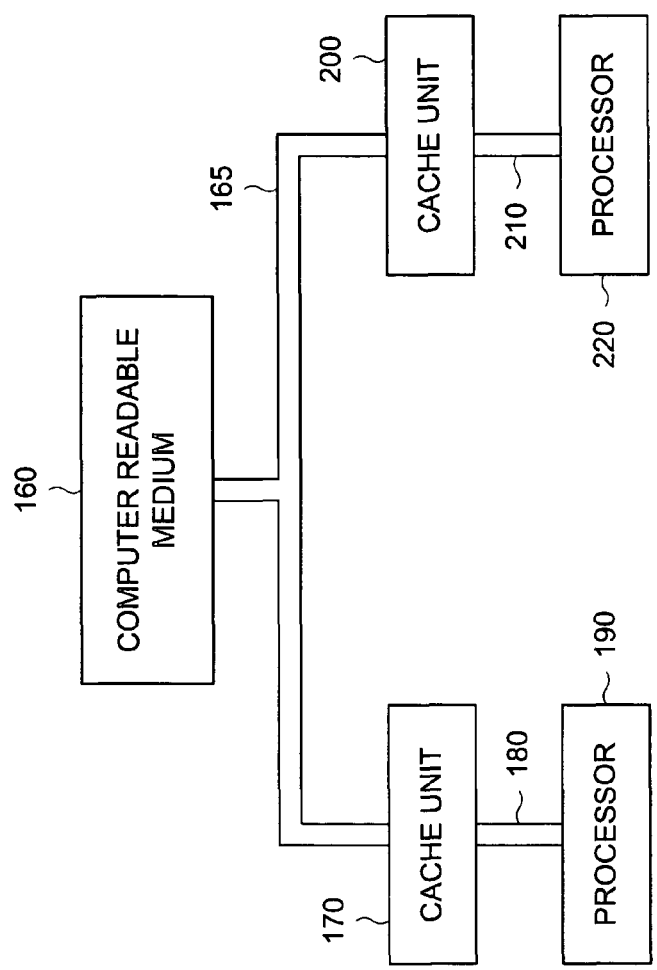
FIG. 6 is a block diagram that depicts one example embodiment of a system for managing a data structure with support for multi-processor access.

FIG. 6 is a block diagram that depicts one example embodiment of a system for managing a data structure with support for multi-processor access. According to this example embodiment, a system for managing a data structure with support for multi-processor access comprises a computer readable medium 160 capable of storing a data structure, a spin-lock, and one or more instruction sequences. The system further comprises a plurality of processors 190, 220 each capable of executing an instruction sequence. The system still further comprises a plurality of cache units 170, 200 each being associated with a corresponding processor 190, 220, respectively. In this example embodiment, a separate cache memory bus 180, 210 communicatively couples a processor 190, 220 to its corresponding cache unit 170, 200. The cache units 170, 200, in turn, are communicatively coupled to the computer readable medium 160 by means of a main memory bus 165.

This example embodiment further comprises various functional modules each of which comprises an instruction sequence that can be executed by one of a plurality of processors 190, 220. The reader is advised that the term "minimally causes the processor" and variants thereof is intended to serve as an open-ended enumeration of functions performed by the processor as it executes a particular functional module (i.e. instruction sequence). As such, an embodiment where a particular functional module causes the processor to perform functions in addition to those defined in the appended claims is to be included in the scope of the claims appended hereto.

Figure 7:
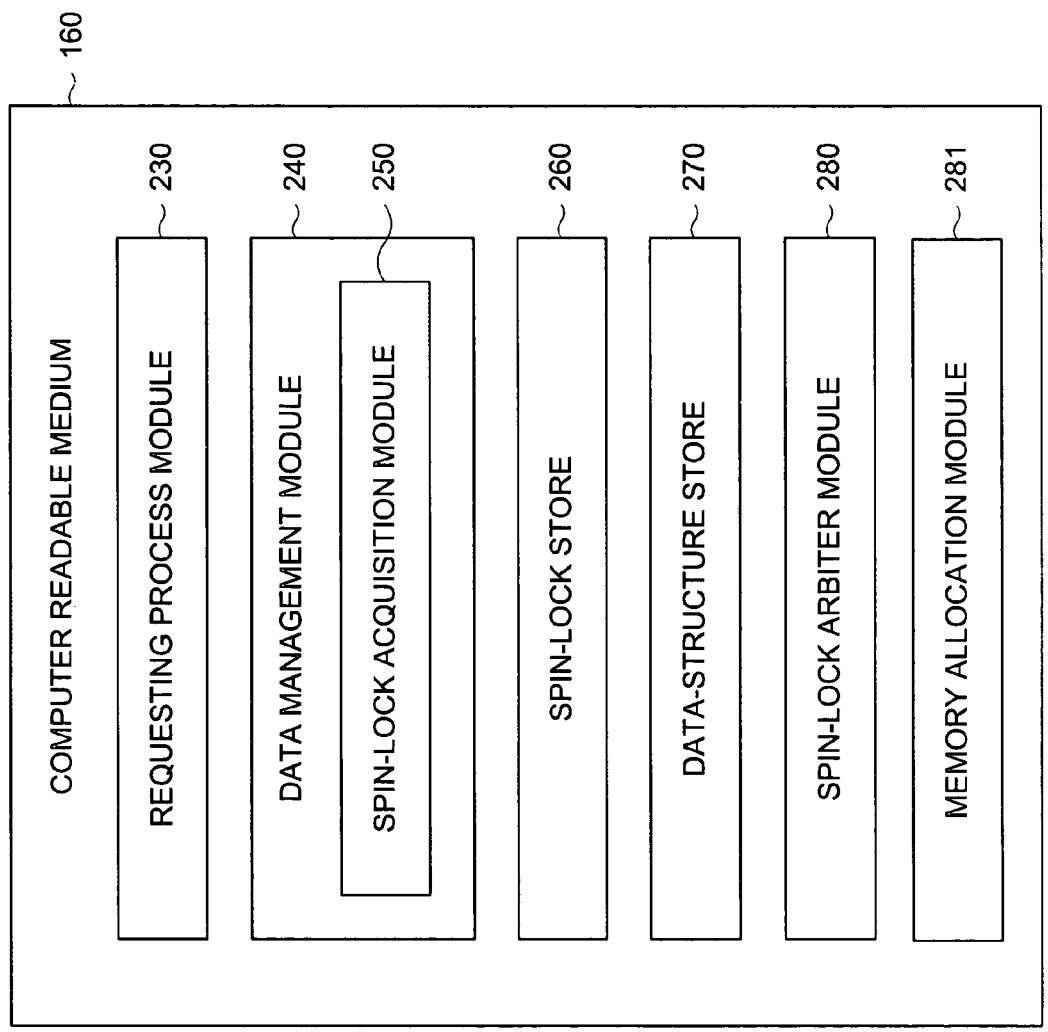
FIG. 7 is a block diagram that depicts the storage of functional modules in the computer readable medium.

FIG. 7 is a block diagram that depicts the storage of functional modules in the computer readable medium. According to this example embodiment, the computer readable medium 160 has stored therein one or more functional modules including a requesting process module 230 and a data management module 240. A portion of the computer readable medium 160 is allocated to the storage of a data structure 270 and a corresponding spin-lock 260. According to one alternative embodiment, the data management module 240 includes a spin-lock acquisition module 250 that enables acquisition of a spin-lock. Although not required, a spin-lock arbiter module 280 is also included in one alternative embodiment.

Figure 8:
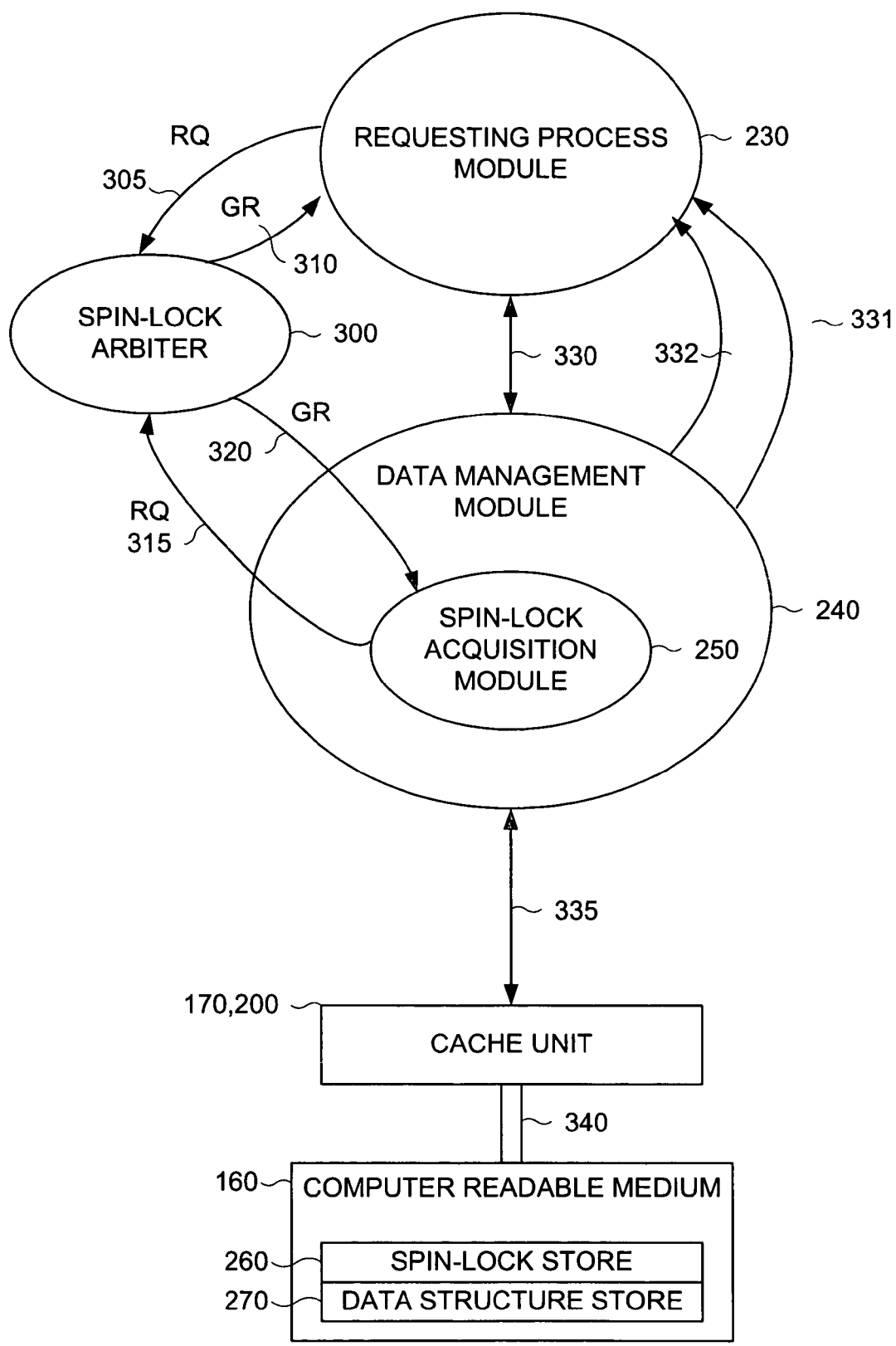
FIG. 8 is a data flow diagram that depicts the internal operation of one example embodiment of a system for managing a data structure with support for multi-processor access.

FIG. 8 is a data flow diagram that depicts the internal operation of one example embodiment of a system for managing a data structure with support for multi-processor access. When executed by at least one of the processors 190, 220 the requesting process module 230 minimally causes the processor 190, 220 to request a data structure stored in a data structure store 270. The request is conveyed 330 to the data management module 240. The data management module 240 of this example embodiment, when executed by one of the processors 190, 220, minimally causes the processor 190, 220 to fetch from the computer readable medium 160 the requested data structure and a corresponding spin-lock, which is stored in the spin-lock store 260. As the request is made, a hardware cache control unit causes the data structure and the corresponding spin-lock to be stored 340 in a cache unit 170, 200 that corresponds to the processor 190, 220 that is executing the data management module 240. The data structure and the corresponding spin-lock are stored in a single line of a cache unit 170, 200. This is accomplished by situating the spin-lock store 260 and the data structure store 270 in the computer readable medium 160 such that both are found within a single cache line in the computer readable medium 160.

FIG. 8 further illustrates that, according yet another alternative embodiment, the data management module 240 includes a spin-lock acquisition module 250. The spin-lock acquisition module 250, when executed by one of the processors 190, 220, minimally causes the processor 190, 220 to interact with a spin-lock arbiter 300. This example embodiment of the data management module 240 causes one of the processors 190, 220 to provide exclusive access by minimally causing the processor 190, 220 to execute a spin-lock acquisition module 250. As a result, the spin-lock acquisition module 250 dispatches to the spin-lock arbiter 300 a request 315 for a spin lock. The spin-lock arbiter 300, when executed by one of the processors 190, 220, then provides a grant 320 back to the spin-lock acquisition module 250 indicating that the spin-lock has been granted to the spin-lock acquisition module 250 of this example embodiment.

According to yet another alternative embodiment, the data management module 240, when executed by one of the processors 190, 220, causes the processor to provide exclusive access to a data structure by minimally causing the processor 190, 220 to provide back to the requesting process module 230 a reference to the spin lock 331. The requesting process module 230 must then contend for the spin lock using a request 305 and grant 310 procedure as it interacts with a spin-lock arbiter 300. Once the requesting process module 230 acquires the spin-lock, it receives a reference 332 to the data structure.

According to yet to another alternative embodiment, a system for managing a data structure with support for multi-processor access further comprises a memory allocation module 281. The memory allocation module 281, when executed by one of the processors 190, 220, minimally causes the processor 190, 220 to allocate space in the computer readable medium 160 for a spin-lock store 260 and a data structure store 270, where the allocated space for the spin-lock store 260 and the data structure store 270 is situated in a single cache line in the computer readable medium 160.

The functional modules (and their corresponding instruction sequences) described thus far that enable managing one or more data structures for multi-processor access are, according to one alternative embodiment, imparted onto computer readable medium. Examples of such medium include, but are not limited to, random access memory, read-only memory (ROM), CD ROM, digital versatile disk (DVD), floppy disks, and magnetic tape. This computer readable medium, which alone or in combination can constitute a stand-alone product, can be used to convert a general-purpose computing platform into a device for managing one or more data structures according to the techniques and teachings presented herein. Accordingly, the claims appended hereto are to include such computer readable medium imparted with such instruction sequences that enable execution of the present method and all of the teachings afore described.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A computer-implemented method for managing a data structure for multi-processor access comprising:
   receiving, by at least one computer processor, a request for the data structure from a requestor;
   fetching in response to the request, by the at least one computer processor, the requested data structure and a corresponding spin-lock from a non-transitory computer readable storage medium;
   storing, by the at least one computer processor, the data structure and the corresponding spin-lock in a single cache line; and
   providing, by the at least one computer processor, the requestor with exclusive access to the data structure, wherein
      the spin-lock is to provide integrity of shared data by allowing a single computer processor in a multi-processor system to access the shared data without interference from another computer processor in the system; and
      the single cache line is a part of a cache memory and is addressable by a line address.

2. The computer-implemented method of claim 1, wherein the providing exclusive access to the data structure comprises:
   vying for the corresponding spin-lock; and
   providing a reference to the data structure when the corresponding spin-lock has been acquired.

3. The computer-implemented method of claim 1, wherein the providing exclusive access to the data structure comprises:
   providing a reference to the corresponding spin-lock;
   receiving a request for a data structure reference; and
   providing the data structure reference in response to the request.

4. The computer-implemented method of claim 1, further comprising statically aligning the data structure and the corresponding spin-lock to a cache line boundary.

5. The computer-implemented method of claim 1, further comprising dynamically aligning the data structure and the corresponding spin-lock to a cache line boundary.

6. A computer system for managing a data structure for multi-processor access comprising:
- a non-transitory computer readable storage medium capable of storing a the data structure, a spin-lock, and one or more instruction sequences;
- a plurality of computer processors each capable of executing ah the one or more instruction sequences;
- a plurality of cache units each being associated with a corresponding computer processor; and
- the one or more instruction sequences stored in the non-transitory computer readable storage medium including:
  - a requesting process module that, when executed by a given computer processor, minimally causes the given computer processor to request the data structure stored in the non-transitory computer readable storage medium; and
  - a data management module that, when executed by the given computer processor, minimally causes the given computer processor to:
    - fetch from the non-transitory computer readable storage medium a the requested data structure and a corresponding spin-lock;
    - store the data structure and the corresponding spin-lock in a single cache line of a given cache unit associated with the given computer processor; and
    - provide to the given computer processor exclusive access to the data structure as the given computer processor executes the requesting process module, wherein
      - the spin-lock is to provide integrity of shared data by allowing a single computer processor in the computer system to access the shared data without interference from another computer processor in the computer system; and
      - the single cache line is part of the given cache unit and is addressable by a line address.

7. The computer system of claim 6 wherein the data management module includes a spin-lock acquisition module that, when executed by the given computer processor, minimally causes the given computer processor to:
- interact with a spin-lock arbiter to obtain the spin-lock and wherein the data management module causes the given computer processor to provide the exclusive access by minimally causing the given computer processor to execute the spin-lock acquisition module and provide a reference to the data structure when the given computer processor acquires the spin-lock by executing the spin-lock acquisition module.

8. The computer system of claim 6 wherein the data management module further causes the given computer processor to:
- provide the exclusive access by minimally causing the given computer processor to provide a reference to the spin-lock; and
- provide the reference to the data structure after receiving a request for the data structure reference when the given processor executes the requesting process module.

9. The computer system of claim 6 wherein the data structure and the corresponding spin-lock are contiguous with each other and are statically situated in the single cache line when they are stored in the non-transitory computer readable storage medium.

10. The computer system of claim 6 further comprising a memory allocation module that, when executed by the given computer processor, minimally causes the given computer processor to dynamically situate the data structure and the corresponding spin-lock in a the single cache line when they are stored in the non-transitory computer readable storage medium.

11. A non-transitory computer readable storage medium having stored thereon one or more instruction sequence modules for managing a data structure for multi-processor access including a data management module that, when executed by a computer processor, minimally causes the computer processor to:
- receive a request for the data structure;
- fetch from the non-transitory computer readable storage medium the requested data structure and a corresponding spin-lock;
- store the requested data structure and the corresponding spin-lock in a single cache line of a cache unit associated with the computer processor; and
- provide exclusive access to the requested data structure, wherein
  - the spin-lock is to provide integrity of shared data by allowing a single computer processor in a multi-processor system to access the shared data without interference from another computer processor in the system; and
  - the single cache line is part of the cache unit and is addressable by a line address.

12. The non-transitory computer readable storage medium of claim 11, further comprising a spin-lock acquisition module that, when executed by the computer processor, minimally causes the computer processor to:
- interact with a spin-lock arbiter to obtain the corresponding spin-lock; and
- provide a reference to the data structure when the computer processor acquires the spin-lock.

13. The non-transitory computer readable storage medium of claim 11, wherein the data management module, when executed by the computer processor, further minimally causes the computer processor to:
- provide a reference to the spin-lock; and
- provide a reference to the data structure in response to receiving a request for the reference.

14. The non-transitory computer readable storage medium of claim 11, further comprising a memory allocation module that causes the computer processor to dynamically situate the data structure and the corresponding spin-lock in the single cache line in the non-transitory computer readable storage medium.

15. A computing device comprising a computer processor and a non-transitory computer readable storage medium for managing a data structure for multi-processor access including:
- means for receiving a request for the data structure;
- means for fetching in response to the request the requested data structure and a corresponding spin-lock from the non-transitory computer readable storage medium;
- means for storing the data structure and the corresponding spin-lock in a single cache line; and
- means for providing exclusive access to the data structure, wherein
  - the spin-lock is to provide integrity of shared data by allowing a single computer processor in a multi-processor system to access the shared data without interference from another computer processor in the system; and the single cache line is part of a cache memory and is addressable by a line address.

16. The computing device of claim 15, wherein the means for providing the exclusive access to the data structure comprises:

means for vying for the spin-lock; and means for providing a reference to the data structure when the spin-lock has been acquired.

17. The computing device of claim 15, wherein the means for providing the exclusive access to the data structure comprises:

means for providing a reference to the spin-lock;

means for receiving a request for a data structure reference; and means for providing the data structure reference in response to the request.

18. The computing device of claim 15, further comprising a means for statically situating the data structure and the corresponding spin-lock in the single cache line.

19. The computing device of claim 15, further comprising a means for dynamically situating the data structure and the corresponding spin-lock in the single cache line.

* * * * *

UNITED STATES PATENT AND TRADEMARK OFFICE
CERTIFICATE OF CORRECTION

PATENT NO. : 8,316,048 B2
APPLICATION NO. : 10/920915
DATED : November 20, 2012
INVENTOR(S) : Lisa Liu et al.

It is certified that error appears in the above-identified patent and that said Letters Patent is hereby corrected as shown below:

In the Claims

In column 7, line 10, in Claim 6, after "storing" delete "a".

In column 7, line 14, in Claim 6, before "the" delete "ah".

In column 7, line 28, in Claim 6, after "medium" delete "a".

In column 8, line 8, in Claim 10, after "in" delete "a".

Signed and Sealed this
Fifteenth Day of October, 2013

Teresa Stanek Rea
*Deputy Director of the United States Patent and Trademark Office*